United States Patent [19]
Tunashima et al.

[11] Patent Number: 6,126,915
[45] Date of Patent: Oct. 3, 2000

[54] TITANIUM DIOXIDE REDUCED IN VOLATILE WATER CONTENT, PROCESS FOR PRODUCING THE SAME, AND MASTERBATCH CONTAINING THE SAME

[75] Inventors: Makoto Tunashima; Kazuyoshi Muraoka; Kohji Yamamoto, all of Akita; Susumu Miyasita, Tokyo; Noburu Sakuma, Tokyo; Masaru Hosokawa, Tokyo, all of Japan

[73] Assignees: Tohkem Products Corporation, Akita; Toyo Ink Manufacturing Co., Ltd., Tokyo, both of Japan

[21] Appl. No.: 09/091,884

[22] PCT Filed: Dec. 27, 1996

[86] PCT No.: PCT/JP96/03844

§ 371 Date: Aug. 26, 1998

§ 102(e) Date: Aug. 26, 1998

[87] PCT Pub. No.: WO97/24289

PCT Pub. Date: Jul. 10, 1997

[30] Foreign Application Priority Data

Dec. 27, 1995 [JP] Japan .................................. 7-351284
Aug. 12, 1996 [JP] Japan .................................. 8-212296

[51] Int. Cl.$^7$ .............................. C01G 25/02; C08K 9/10; C08K 3/22

[52] U.S. Cl. .......................... 423/608; 523/210; 523/212; 523/216; 524/497

[58] Field of Search ........................... 524/497; 423/608; 523/210, 212, 211

[56] References Cited

FOREIGN PATENT DOCUMENTS

0292120 A2   11/1988   European Pat. Off. .

*Primary Examiner*—Edward J. Cain
*Attorney, Agent, or Firm*—Birch, Stewart, Kolasch & Birch, LLP

[57] ABSTRACT

Titanium dioxide powder with a greatly decreased volatile moisture content can be obtained by surface treating with titanium dioxide powder with addition of a calcium salt and/or a silane coupling agent, or by a surface treatment by addition of an aluminate together with these surface treatments. A masterbatch containing this titanium dioxide powder is of high quality, having no defect due to foam generation upon high temperature processing.

29 Claims, No Drawings

TITANIUM DIOXIDE REDUCED IN VOLATILE WATER CONTENT, PROCESS FOR PRODUCING THE SAME, AND MASTERBATCH CONTAINING THE SAME

This application is the national phase under 35 U.S.C. §371 of prior PCT International application No., PCT/JP96/03844, which has an International filing date of Dec. 27, 1996, which designated the United States of America, the entire contents of which are hereby incorporated by reference.

TECHNICAL FIELD

The present invention relates to titanium dioxide powder which has a low volatile moisture content and hence is free of the possibility that the quality is deteriorated due to generation of foams upon kneading processing into synthetic resin articles and the like, and to a method for manufacturing the same. Further, the present invention relates to a masterbatch which contains the titanium dioxide powder in a thermoplastic resin. The masterbatch is used when coloring and molding thermoplastic resins, is excellent in high speed and high temperature processability, and can be used for resin molded articles which are uniform and have excellent opacifying properties, particularly those for melt extruded laminate films.

BACKGROUND ART

Titanium dioxide ($TiO_2$: hereafter, sometimes referred to as titanium oxide for brevity) is known as a white pigment, ultraviolet light screening agent or the like, and is utilized widely as a coloring agent or an opacifying agent for plastics articles. Additives such as titanium dioxide and fillers are kneaded into plastics in heated and molten state. Hitherto, polyolefin-based plastics used as a plastic film, sheet or the like are kneaded at a temperature around 200° C., which temperature is lower than the temperature at which engineering plastics are processed. Recently, however, there is a tendency that in order to increase productivity, height temperatures elevated to about 300° C. are used for mixing, kneading and molding so that process time can be reduced. Also, the requirement for the precision of the trimmed shape of articles is becoming stricter. This leads to severer requirement for the physical properties of titanium dioxide powder to be mixed in plastics.

More specifically, titanium dioxide powder is demanded which is easy to disperse in plastics, has high opacifying power, is excellent in weatherability and light resistance, and generates less amount of a gas or gases upon processing. Although titanium dioxide powders are not influenced remarkably by gas generation at kneading temperatures around 200° C., above which temperature the organic components in the surface treating agent used for surface modification of titanium dioxide will decompose or gaseous components will vaporize such as liberation of water of crystallization to form foams, so that there occur frequently problems of causing failure of quality.

When thermoplastic resins are pigmented with the above-mentioned titanium oxide, there is used a pigmenting composition. As the pigmenting composition, there have heretofore been used dry colors in the form of powder which comprise a pigment and a dispersant, liquid colors or paste colors which comprise a pigment dispersed in a dispersant that is liquid at ambient temperature, masterbatches which comprise a resin that is solid at ambient temperature and a pigment dispersed therein in high concentrations, the mixture being shaped into pellets or flakes. Of these, frequently used are masterbatches because they are easy to handle and are excellent in maintaining operational environment upon use.

As described above, titanium oxide is used in large amounts as a white pigment for pigmenting resins because of its excellent whiteness, high opacifying properties, and high pigmenting power. However, titanium oxide by nature is hydrophilic and therefore is subjected to surface treatment with inorganic or organic substances in order to improve weatherability, hydrophobicity and dispersibility.

For example, there are known titanium oxides treated with polyol- and polysiloxane-based surface treating agents, respectively. The titanium oxide whose surface is treated with a polyol-based surface treating agent is highly dispersible but it receives less effect of hydrophobic treatment so that it adsorbs much water. Masterbatches which contain such a surface-treated titanium oxide and a thermoplastic resin also are less hydrophobic so that they tend to contain much water.

On the other hand, titanium oxide whose surface is treated with a polysiloxane-based surface treating agent has a weak chemical bonding power between the surface of titanium oxide and the surface treating agent although it receives excellent hydrophobic effect so that the surface treating agent will peel off depending on the kneading conditions or extruding conditions when preparing the masterbatch by using these titanium oxide and a thermoplastic resin, which results in unevenness in the state of dispersion of titanium oxide in the masterbatch or an increase in the moisture content of the masterbatch because of a decrease in hydrophobicity.

When it is tried to prepare pigmented resin molded articles using a masterbatch with a high moisture content and a thermoplastic resin, the masterbatch and thermoplastic resin will slide in the extruding machine due to the moisture generated in the masterbatch. This causes a failure of dispersing or the moisture to return to the feeding port of the machine for feeding raw materials so that the raw materials cannot be fed smoothly. This is also a problem.

In particular, in the field of melt-extruded laminates which require high temperature processing at temperatures as high as 280 to 350° C. at which elimination of water of crystallization will occur, moisture content is extremely important; a problem arises that if the moisture content is high, water evaporates when extruding a film and there occurs the phenomenon that reticulated pores are formed in the film, i.e., so-called lacing, so that the film cannot be put in practical use.

The present invention is to solve the above-described problems accompanying the conventional titanium dioxides and has an object of the present invention to provide titanium dioxide powder which has sufficient dispersibility and hydrophobicity and generates less evaporated water upon high temperature processing when kneaded into synthetic resin articles, and a manufacturing method therefor as well as to provide a masterbatch which generates less moisture upon high temperature processing.

Further, in a preferred embodiment, the present invention provides anatase-type titanium dioxide which generates less evaporated water and has a high color stability and a manufacturing method therefor as well as a masterbatch containing such an anatase-type titanium dioxide.

DISCLOSURE OF THE INVENTION

The titanium dioxide of the present invention is (1) titanium dioxide having a volatile moisture content of 800 ppm or less, (2) preferably 650 ppm or less, at heat processing temperatures of 200 to 350° C.

Further, the titanium dioxide of the present invention contains (3) anatase type titanium dioxide containing in its crystal divalent or trivalent non-colored cations whose hexa-coordination (six-coordination) ionic radius is 0.6Å or more and 0.9Å or less and which has a volatile moisture content of 800 ppm or less at heat processing temperatures of 200 to 350° C. The cations introduced in the crystal are preferably aluminum ions and zinc ions, and (4) their introduction amount is suitably 0.02 to 0.4 wt % of aluminum or 0.05 to 1.0 wt % of zinc. (5) When both of them are introduced, suitably the sum of the both is 0.02 to 1.0 wt % and the content of aluminum is 0.4 wt % or less. Further, (6) as for the size of the particle, it is suitable that their primary particles have an average particle size of 0.01 to 1.0 μm.

According to the present invention, (7) there is provided a method for manufacturing titanium dioxide characterized by comprising: adding to titanium dioxide powder 0.01 to 0.5 wt % in terms of calcium oxide of a calcium salt and/or 0.05 to 3.0 wt % of a silane coupling agent; and treating therewith the titanium dioxide powder so that the titanium dioxide has a volatile moisture content of 800 ppm or less at heat processing temperatures of 200 to 350° C.

The above-mentioned manufacturing method includes (8) a method in which together with the treatment with the calcium salt and/or silane coupling agent, a treatment with 0.3 wt % or less in terms of alumina of an aluminate is performed, (9) a method in which the treatment by addition of the calcium salt is followed by the treatment by addition of the silane coupling agent, (10) a method in which the treatment by addition of the calcium salt is followed by the treatment by addition of the aluminate and then the treatment by addition of the silane coupling agent, (11) a method in which the treatment by addition of the aluminate is followed by addition of the silane coupling agent.

In these manufacturing methods, (12) the titanium dioxide powder may be converted to a slurry, to which is added the above-mentioned surface treating agent such as calcium salt, or (13) the titanium dioxide powder may be fluidized with air stream, to which is added the above-mentioned surface treating agent such as calcium salt.

(14) As the calcium salt, calcium chloride, calcium bromide, calcium iodide or calcium nitrate is suitable. (15) As the silane coupling agent, methyltrimethoxysilane, γ-glycidoxypropyltri-methoxy-silane, γ-aminopropyltriethoxy-silane, vinyltriethoxy-silane, phenyltrialkoxysilane, or dialkyldialkoxysilane is preferred.

Further, in the above-mentioned manufacturing methods of the present invention, (16) 0.05 to 3.0 wt % of triethanolamine may be used in place of the silane coupling agent. (17) 0.01 to 0.5 wt % in terms of magnesium oxide of a magnesium salt may be used in place of the calcium salt. (18) As the magnesium salt may be used magnesium sulfate, magnesium chloride, magnesium bromide or magnesium iodide. Besides, (19) there may be used 0.3 wt % or less in terms of silica of a silicate in place of the aluminate.

The above-mentioned manufacturing method includes (20) a method in which after the surface treatment, the powder is dried or pulverized at temperatures of 200° C. or higher, (21) a method in which after the drying, the powder is pulverized in the presence of an organic dispersant, (22) a method in which at least one of silane coupling agents, titanium coupling agents, silicone oil, polyhydric alcohols, alkyldisilazanes, and alkanolamines is used as the organic dispersant.

Further, according to the present invention, there is provided a masterbatch comprising a thermoplastic resin containing therein titanium dioxide, More specifically, (23)a masterbatch comprising a thermoplastic resin containing therein titanium dioxide having a volatile moisture content of 800 ppm or less at heat processing temperatures of 200 to 350° C.

The masterbatch of the present invention includes (24) a masterbatch comprising a thermoplastic resin containing therein anatase type titanium dioxide containing in its crystal divalent or trivalent non-colored cations whose hexacoordination ionic radius is 0.6 Å or more and 0.9 Å or less and which have a volatile moisture content of 800 ppm or less at heat processing temperatures of 200 to 350° C.

The above-mentioned masterbatch includes (25) a masterbatch in which the titanium dioxide contains 0.02 to 0.4 wt % of aluminum or 0.05 to 1.0 wt % of zinc in its crystal, (26) a masterbatch in which the titanium dioxide contains aluminum and zinc in the crystal and wherein the sum of the both is 0.02 to 1.0 wt % and the content of aluminum is 0.4 wt % or less, (27) a masterbatch in which primary particles of the titanium dioxide has an average particle size of 0.01 to 1.0 μm.

Further, the masterbatch of the present invention includes those which contain titanium dioxide obtained by the above-mentioned manufacturing methods. More specifically, the followings are included. (28) A masterbatch comprising a thermoplastic resin containing therein titanium dioxide having a volatile moisture content of 800 ppm or less at heat processing temperatures of 200 to 350° C. by adding to titanium dioxide powder 0.01 to 0.5 wt % in terms of calcium dioxide of a calcium salt and/or 0.05 to 3.0 wt % of a silane coupling agent. (29) A masterbatch comprising titanium dioxide, said titanium dioxide being treated, together with the calcium salt and/or silane coupling agent, with 0.3 wt % or less in terms of alumina of an aluminate. (30) A masterbatch comprising titanium dioxide, said titanium dioxide being treated, after being treated by addition of the calcium salt, by addition of the silane coupling agent. (31) A masterbatch comprising titanium dioxide, said titanium dioxide being treated, after being treated by addition of the calcium salt, by addition of the aluminate, and then treated by addition of the silane coupling agent. (32) A masterbatch comprising titanium dioxide, said titanium dioxide being treated, after being treated by addition of the aluminate, by addition of the silane coupling agent. (33) A masterbatch comprising titanium dioxide, said titanium dioxide being treated, after said titanium dioxide powder being converted to an aqueous slurry, by additon of said calcium salt and/or silane coupling agent to said slurry, or treated by addition of said aluminate therewith. (34) A masterbatch comprising titanium dioxide, said titanium dioxide being treated, after said titanium dioxide powder being fluidized with air stream, by addition of said calcium salt and/or silane coupling agent thereto, or by addition of said aluminate therewith. (35) A masterbatch comprising titanium dioxide, said titanium dioxide being treated using, as said calcium salt, calcium chloride, calcium bromide, calcium iodide or calcium nitrate. (36) A masterbatch comprising titanium dioxide, said titanium dioxide being treated using, as said silane coupling agent, methyltrimethoxysilane, γ-glycidoxypropyltrimethoxy-silane, γ-aminopropyltriethoxysilane, vinyltriethoxysilane, phenyltrialkoxysilane, or dialkyldialkoxysilane. (37) A masterbatch comprising titanium dioxide, said titanium dioxide being treated using 0.05 to 3.0 wt % of triethanolamine in place of said silane coupling agent. (38) A masterbatch comprising titanium dioxide, said titanium dioxide being treated using 0.01 to 0.5 wt % in terms of magnesium oxide of a magnesium salt in place of said calcium salt. (39) A masterbatch comprising titanium dioxide, said titanium dioxide being treated using, as said magnesium salt, magnesium sulfate, magnesium chloride, magnesium bromide or magnesium iodide. (40) A masterbatch comprising titanium dioxide, said titanium dioxide being treated using 0.3 wt % or less in terms of silica of a silicate in place of said aluminate. (41) A masterbatch comprising titanium dioxide, said titanium dioxide being, after said surface treatment, dried or pulverized at temperatures of 200° C. or higher. (42) A masterbatch comprising titanium dioxide, said titanium dioxide being, after said drying, pulverized in the presence of an organic dispersant. (43) A masterbatch, wherein said organic dispersant is at least one of silane coupling agents, titanium coupling agents, silicone oil, polyhydric alcohols, alkyldisilazanes, and alkanolamines. (44) A masterbatch, wherein said volatile moisture content is 1,200 ppm or less at temperatures of 280 to 350° C. (45) A masterbatch, wherein said masterbatch is one for use in a melt extrusion laminate film.

BEST MODE FOR CARRYING OUT THE INVENTION (I) Titanium dioxide of the invention The titanium dioxide powder of the present invention evaporates water in amounts of 800 ppm or less, preferably 650 ppm or less, at heat treatment temperatures of 200 to 350° C. In the case of the titanium dioxide powder of the present invention, there is used no treating agent containing moisture or organic components that will be decomposed or liberated at 200 to 350° C. but use is made of a treating agent which combines with hydroxyl groups on the surface of titanium dioxide in order to fix the hydroxyl groups on the surface of the titanium dioxide powder and suppress the generation of steam upon heat treatment. The major volatile component of the titanium dioxide powder is hydroxyl groups on the surface of the powder particles and the present invention fixes the hydroxyl groups to the surface of the powder particles to greatly reduce the amount of gas generation upon heat treatment.

There is no limitation on the manufacturing method for manufacturing the titanium dioxide powder used in the surface treatment according to the present invention and the powder may be titanium dioxide obtained by a sulfuric acid method or titanium dioxide obtained by a chlorine method. The type of crystal of the powder is not limited too and either rutile type titanium oxide or anatase type titanium dioxide may be used. The particle size of the titanium dioxide is selected appropriately depending on use. The titanium dioxide generally used in paints, plastics, ink, paper and the like has an average particle size of preferably 0.01 to 1.0 $\mu$ and more preferably 0.1 to 0.5 $\mu$.

As the anatase type titanium dioxide, there may be used those having increased color stability by incorporating non-colored cations in the crystal. Generally, titanium dioxide crystals have more or less partial structural defects and an increase in structural defects results in a decrease in chemical stability so that discoloration tends to occur at high temperatures. Although the conventional anatase type titanium dioxide is lower in color stability than the rutile type one, introduction of cations into the crystal to make up the defects can give rise to anatase type titanium dioxide which has high whiteness, does not tend to get discolored even during treating at high temperatures, and is excellent in resistance to light and in weatherability. Since a titanium dioxide crystal is composed of hexacoordination titanium ions ($Ti^{4+}$), the cations to be incorporated into the crystal need to be divalent or trivalent and have an ionic radius close to that of the hexacoordination titanium ion ($Ti^{4+}$) and non-colored.

That is, such titanium dioxide is anatase type titanium dioxide which has been stabilized with respect to color by incorporating into titanium dioxide crystals divalent or trivalent non-colored cations having an ionic radius close to that of hexacoordination titanium ion ($Ti^{4+}$), i.e., not smaller than 0.6 Å and not larger than 0.9 Å. Incidentally, the above-mentioned ionic radius is a value derived based on the diameters of hexacoordination $O^{2-}$ and $F^-$ which are assumed to be 1.26 Å and 1.19 Å, respectively. The cations which meet the requirements include $Al^{3+}$, $Zn^{2+}$, $Ga^{3+}$, $Mg^{2+}$ and the like. Of these, preferred are aluminum ion and zinc ion from the viewpoints of effect and economy.

The amount of the cation to be incorporated is suitably 0.02 to 0.4 wt % for aluminum, and 0.05 to 1.0 wt % for zinc. When both of them are incorporated, it is suitable that the sum of them is 0.02 to 1.0 wt % and the aluminum content is 0.4 wt % or less. As for the size of the titanium dioxide particle, it is suitable that the average particle size of the primary particle is in the range of 0.01 to 1.0 $\mu$m.

The anatase type titanium dioxide incorporated in the crystal aluminum and/or zinc can be manufactured by adding an aluminum compound and/or a water-soluble zinc compound to hydrous titanium dioxide obtained by the hydrolysis of titanium sulfate and sintering the mixture at 850 to 1,100° C.

(II) The manufacturing method of the present invention

The surface-treated titanium dioxide powder of the present invention is obtained by a wet process in which titanium dioxide powder as a raw material is converted to aqueous slurry, to which is added the following surface treating agent, and after reaction the reaction mixture is dried. Alternatively, it is obtained by a dry method in which the titanium oxide powder as a raw material is converted into a fluidized state, to which is sprayed the following surface treating agent and reaction is performed.

As the surface treating agent, there are used calcium salts and silane coupling agents, which may be used in combination with aluminates. Instead of the calcium salts may be used magnesium salts and the silane coupling agents may be replaced by triethanolamine and the like. Further, silicates may be used instead of the aluminates.

As the calcium salts, there may be used those which do not decompose at 200 to 350° C. and combine with hydroxyl groups on the surface of titanium dioxide powder to dehydrate it. More specifically, calcium chloride, calcium bromide, calcium iodide, calcium nitrate and the like are suitable.

The amount of the calcium salt to be added is suitably 0.01 to 0.5 wt % in terms of calcium oxide based on the solid content of titanium dioxide. If the above-mentioned addition amount is below 0.01 wt %, the surface treatment is insufficient and if the addition amount is above 0.5 wt %, Ca ions are not adsorbed, thus not only failing to exhibit surface treatment effects but also forming complicated salts when used in combination with aluminates, silicates or the other surface treating agents to sometimes show undesirable effects. As a result of the surface treatment with calcium salts, the surface of the titanium dioxide is dehydrated and the surface of titanium dioxide is coated with the dehydration product containing calcium connected thereto.

As means for fixing hydroxyl groups on the surface of the titanium dioxide powder, silane coupling agents may be used instead of the above-mentioned calcium salts. The silane coupling agents fix the hydroxyl groups on the surface of titanium oxide by reaction therewith to render hydrophobic the titanium oxide and increase dispersibility thereof as well. The surface treatment with the silane coupling agents in the case of a wet manufacturing method is performed by converting titanium dioxide powder as a raw material to aqueous slurry, adding a silane coupling agent thereto with uniform stirring, standing the powder for about 30 minutes for aging, and then drying it. A dry manufacturing method is performed by spraying a silane coupling agent onto titanium dioxide powder in a fluidized state, and standing and drying the powder.

As the silane coupling agent are used those which are hard to decompose at 200 to 350° C. Specific examples thereof include those having the structures represented by the general formulae (1) to (4) below, for example, methyltrimethoxysilane, γ-glycidoxypropyltrimethoxysilane, γ-aminopropyltriethoxysilane, γ-meth-acryloxypropyltri-methoxysilane, vinyltriethoxysilane, phenyl-alkoxysilanes such as phenyl-trialkoxysilane and diphenyl-dialkoxysilane, and dialkyl-dialkoxysilanes such as dimethyldimethoxysilane and dimethyldiethoxysilane, and the like. Among the organic functional groups represented by the general formula (1) to (4) below, those having a methyl group or an amino group are preferred, of which suitable is dialkyldialkoxysilanes, with dimethyldimethoxysilane being particularly preferred.

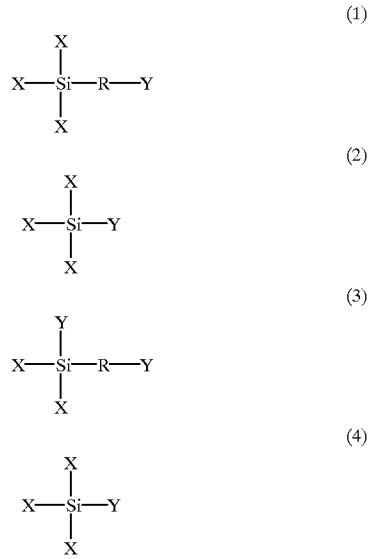

X: hydrolyzable group
$CH_3O$—, $C_2H_5O$—, $CH_3OC_2H_4O$—, Cl—, etc.
R: Divalent aliphatic chain, divalent aromatic chain
Y: Organic functional group
  a methyl group, an ethyl group, a vinyl group, an epoxy group, an amino group, a mercapto group, an acrylic group, a methacrylic group, etc.

The amount of the silane coupling agent to be added is suitably 0.05 to 3.0 wt %, preferably 0.05 to 1.0 wt %, more preferably 0.1 to 0.5 wt %, most preferably 0.1 to 0.3 wt %, based on the solids content of the titanium dioxide. If the addition amount is less than 0.05 wt %, the bonding with hydroxyl groups will be insufficient while an addition amount of more than 3.0 wt % is not desirable since the silane coupling agent will be condensed and the surface treatment effect will be saturated only to increase costs.

When the surface-treated titanium dioxide is blended with a resin, addition of the silane coupling agent in amounts exceeding 3.0 wt % causes the resin to slip when it is extrusion molded so that extrusion of the material becomes unstable and therefore stable manufacture of pigmented compositions cannot be achieved. In particular, in the case of a film, the film thickness is non-uniform or there occurs film cutting so that the molding is no longer possible. On the other hand, if the addition amount of the silane coupling agent is below 0.1 wt %, the effect of rendering titanium oxide hydrophobic is weak, so that the amount of water adsorption after the manufacture of the masterbatch increases with time and hence a problem arises similar to the conventional one.

Combined use of the surface treatment with the calcium salts and the surface treatment with the silane coupling agent can fix hydroxyl groups on the surface of the powder to further suppress the amount of gas generation. More specifically, 0.01 to 0.5 wt % in terms of calcium oxide of a calcium salt is added to titanium dioxide powder to coat the surface of the powder therewith and thereafter 0.05 to 3.0 wt % of a silane coupling agent is added and aged. Although either of the surface treatment with a calcium salt and the surface treatment with a silane coupling agent may be performed first, it is preferred to perform the surface treatment with a calcium salt followed by the surface treatment with a silane coupling agent since stable treatment conditions are obtained when the surface treatment with a calcium salt which has higher power of bonding (ionic bonding) to the surface of the powder is carried out first.

A further improvement of the surface properties can be obtained by conducting surface treatment with an aluminate in addition to the surface treatment with a calcium salt, the surface treatment with a silane coupling agent, or the surface treatment with a calcium salt and a silane coupling agent. As the aluminate, there may be used sodium aluminate, and as the aluminum salt, there may be used aluminum sulfate, aluminum nitrate, aluminum chloride and so on. By adding an aluminate after the surface treatment with a calcium salt, a coating of hydrous alumina is formed over the coating of the dehydration product of calcium. This improves weatherability and opacifying properties.

It should be noted that the hydrous alumina contains structural water which evaporates at 200 to 300° C. and in order to form a coating of hydrous alumina it is suitable to use hydrous alumina in amounts of 0.3 wt % or less, preferably 0.01 to 0.2 wt %, in terms of alumina ($Al_2O_3$). If the amount exceeds 0.3 wt %, the moisture content increases so that troubles upon processing and the like tend to occur.

It is advisable to perform surface treatment with a silane coupling agent after the surface treatment with an aluminate. Since the surface treatment with a silane coupling agent dehydrates the hydrous groups in the alumina coating, the amount of water to be evaporated will be decreased further.

Silicates may be used instead of aluminates. It is preferred to use aluminates from the viewpoint of excellent dispersibility. The amount of silicates to be used is the same as that of the aluminates and is suitably 0.3 wt % or less, preferably 0.01 to 0.2 wt %, in terms of silicon dioxide ($SiO_2$) based on the solids content of titanium dioxide. As the silicate, there may be used sodium silicate, and as the silicon compound, there may be used silicon tetrachloride, ethyl silicate, and the like.

In the above-mentioned surface treatments, magnesium salts may be used instead of the calcium salts for each of the cases where calcium salts are used. By the surface treatment with a magnesium salt, there can be obtained the same effects as that obtained with the calcium salts.

As the magnesium salt, there may be used water-soluble magnesium salt such as magnesium sulfate, magnesium chloride, magnesium bromide or magnesium iodide. The magnesium salt may be used in almost the same amount as the calcium salt and is suitably in amounts of 0.01 to 0.5 wt % in terms of magnesium (MgO) oxide based on the titanium dioxide (solids content).

Further, in any case of the above-mentioned surface treatments with the silane coupling agents, there may be used titanium coupling agents, silicone oil, polyhydric alcohols, alkyldisilazanes or alkanolamines such as triethanolamine instead of the silane coupling agents. The amount of the triethanolamine or the like to be added is, as in the case of the silane coupling agents, suitably 0.05 to 3.0 wt %, preferably 0.05 to 1.0 wt %, more preferably 0.1 to 0.5 wt %, and most preferably 0.1 to 0.3 wt %, based on the solids content of titanium dioxide. If the addition amount is less than 0.05 wt %, the bonding with hydroxyl groups is insufficient while above 3.0 wt % the silane coupling agent itself condenses or the effects of surface treatment is saturated so that costs will increase.

The titanium dioxide powder after the above-mentioned surface treatment is filtered, dried and pulverized. The drying temperature is suitably at 200° C. or higher and upon this drying gaseous components which will gasify at temperatures below 200° C. are removed. Further, addition of a silane coupling agent after the surface treatment with a calcium salt and drying or at the time of pulverizing will further decrease the amount of water evaporated. The addition amount in this case may be the same as the addition amount in the case of the surface treatment with aqueous slurry.

As the organic dispersant to be added upon pulverizing, there may be used titanium coupling agents, silicone oil, polyhydric alcohols or alkanolamines instead of the silane coupling agents. Although the effect of the organic dispersants on the hydroxyl groups on the surface of titanium dioxide is not clear enough, it would be possible that the chemical reaction, hydrogen bonding or the like could elevate the temperature of thermal elimination of surface hydroxyl groups.

The titanium dioxide powder obtained after the above-mentioned processing steps contains volatile components which evaporate at temperatures of 200 to 350° C. in amounts of 800 ppm or less, preferably 650 ppm or less so that when kneaded into plastics at such temperatures, the effects of generation of foams can be minimized.

Major surface treatment methods described above are summarized in Table 1.

In each of the processing methods below, the respective amounts of the calcium salts, silane coupling agents, aluminates, silicates, triethanolamine, magnesium salts to be added to titanium dioxide are based on the solids content of titanium dioxide and 0.01 to 0.5 wt % in terms of calcium oxide for the calcium salts, 0.05 to 3.0 wt % for the silane coupling agents and triethanolamine, 0.3 wt % or less in terms of alumina for the aluminates, 0.01 to 0.3 wt % in terms of silica for the silicates, and 0.01 to 0.5 wt % in terms of magnesium oxide for the magnesium salts. Further, the processing method may be either by a wet process or by a dry process. After the processing, drying and pulverizing are performed to obtain the target titanium dioxide powder. pH adjustment may be performed, if desired.

TABLE 1

| | | Surface Treatment of Titanium Dioxide |
| --- | --- | --- |
| No. | Al in crystal | Method of Surface Treatment (wt % is in terms of oxide) |
| 1 | 0.02 to 1.0 wt % | 0.01 to 0.5 wt % calcium salt treatment |
| 2 | 0.02 to 1.0 wt % | 0.05 to 0.5 wt % calcium salt treatment, and then 0.05 to 3.0 wt % silane coupling agent treatment |
| 3 | 0.02 to 1.0 wt % | 0.01 to 0.5 wt % calcium salt treatment, and then 0.01 to 0.5 wt % aluminate salt treatment |
| 4 | 0.02 to 1.0 wt % | 0.01 to 0.5 wt % calcium salt treatment, 0.01 to 0.3 wt % aluminate salt treatment, and then 0.05 to 3.0 wt % silane coupling agent treatment |
| 5 | 0.02 to 1.0 wt % | 0.01 to 0.5 wt % calcium salt treatment, and then 0.01 to 0.3 wt % silicate treatment |
| 6 | 0.02 to 1.0 wt % | 0.01 to 0.5 wt % calcium salt treatment, 0.01 to 0.3 wt % silicate treatment, and then 0.05 to 3.0 wt % silane coupling treatment |
| 7 | 0.02 to 1.0 wt % | 0.01 to 0.5 wt % magnesium salt treatment |
| 8 | 0.02 to 1.0 wt % | 0.05 to 0.5 wt % magnesium salt treatment, and then 0.05 to 3.0 wt % silane coupling agent treatment |
| 9 | 0.02 to 1.0 wt % | 0.01 to 0.5 wt % magnesium salt treatment, and then 0.01 to 0.5 wt % aluminate salt treatment |
| 10 | 0.02 to 1.0 wt % | 0.01 to 0.5 wt % magnesium salt treatment, 0.01 to 0.3 wt % aluminate salt treatment, and then 0.05 to 3.0 wt % silane coupling agent treatment |
| 11 | 0.02 to 1.0 wt % | 0.01 to 0.5 wt % magnesium salt treatment, and then 0.01 to 0.3 wt % silicate treatment |
| 12 | 0.02 to 1.0 wt % | 0.01 to 0.5 wt % magnesium salt treatment, 0.01 to 0.3 wt % silicate treatment, and then 0.05 to 3.0 wt % silane coupling treatment |
| 13 | 0.02 to 1.0 wt % | 0.05 to 3.0 wt % silane coupling agent treatment |
| 14 | 0.02 to 1.0 wt % | 0.01 to 0.3 wt % aluminate treatment, and then 0.05 to 3.0 silane coupling agent treatment |
| 15 | 0.02 to 1.0 wt % | 0.01 to 0.3 wt % silicate treatment, and then 0.05 to 3.0 silane coupling agent treatment |
| 16 | 0.02 to 1.0 wt % | 0.01 to 0.5 wt % calcium salt treatment, and then 0.05 to 3.0 wt % triethanolamine treatment |

TABLE 1-continued

| | Surface Treatment of Titanium Dioxide | |
|---|---|---|
| No. | Al in crystal | Method of Surface Treatment (wt % is in terms of oxide) |
| 17 | 0.02 to 1.0 wt % | 0.01 to 0.5 wt % calcium salt treatment, 0.01 to 0.3 wt % aluminate treatment, and then 0.05 to 3.0 wt % triethanolamine treatment |
| 18 | 0.02 to 1.0 wt % | 0.01 to 0.5 wt % calcium salt treatment, 0.01 to 0.3 wt % silicate treatment, and then 0.05 to 3.0 wt % triethanolamine treatment |
| 19 | 0.02 to 1.0 wt % | 0.01 to 0.5 wt % magnesium salt treatment, and then 0.05 to 3.0 wt % triethanolamine treatment |
| 20 | 0.02 to 1.0 wt % | 0.01 to 0.5 wt % magnesiumn salt treatment, 0.01 to 0.3 wt % aluminate treatment, and then 0.05 to 3.0 wt % triethanolamine treatment |
| 21 | 0.02 to 1.0 wt % | 0.01 to 0.5 wt % magnesium salt treatment, 0.01 to 0.3 wt % silicate treatment, and then 0.05 to 3.0 wt % triethanolamine treatment |
| 22 | 0.02 to 1.0 wt % | 0.05 to 3.0 wt % triethanolamine treatment |
| 23 | 0.02 to 1.0 wt % | 0.01 to 0.5 wt % aluminate treatment, and then 0.05 to 3.0 wt % triethanolamine treatment |
| 24 | 0.02 to 1.0 wt % | 0.01 to 0.3 wt % silicate treatment, and then 0.05 to 3.0 wt % triethanolamine treatment |

(III) Masterbatch containing the above-mentioned titanium dioxide

The titanium dioxide used in the masterbatch of the present invention evaporates water in amounts of 800 ppm or less, preferably 650 ppm or less upon heat processing at 200 to 350° C. and is surface treated with calcium salts, silane coupling agents, aluminates used in combination with these, magnesium salts used in place of the calcium salts, triethanolamine used in place of the silane coupling agents, or silicates used in place of the aluminates, more specifically surface treated by the above-mentioned methods 1 to 24.

The titanium dioxide used in the masterbatch of the present invention has a size of preferably 0.01 to 1.0 μ, more preferably 0.1 to 0.5 μ, in average particle size. The type of crystal is either rutile type or anatase type, with anatase type being preferred from the viewpoint of whiteness.

When neither of treatments with organic treating agents such as silane coupling agents nor treatments with inorganic treating agents such as alumina is conducted, the dispersion of titanium oxide is very poor and agglomerates will appear in the pigmented resin molded articles to cause problems such as clogging of screen mesh of a molding machine.

The thermoplastic resin used in the present invention includes polyolefin based resins, polyester based resins, polystyrene based resins, nylon resins and the like which are generally used as thermoplastic resins. In the field of melt extrusion laminates, polyolefin based resins and polyester based resins are used. For melt extrusion laminates on paper substrates, in particular polyolefin based resins are preferred, of which polyethylene based resins are preferred. For melt extrusion laminates on metal substrates, in particular polyester based resins are preferred, of which polyethylene terephthalate is preferred.

The masterbatch of the present invention is a blend of 10 to 400 parts by weight, preferably 100 to 300 parts by weight, most preferably 150 to 250 parts by weight, of the surface treated titanium dioxide described above per 100 parts by weight of the thermoplastic resin.

The masterbatch of the present invention evaporates water in amounts of 1,200 ppm or less, preferably 800 ppm or less, at 280 to 350° C., and more preferably 600 ppm or less at 300° C. When it is attempted to obtain pigmented resin molded articles from thermoplastic resins using masterbatches whose volatile moisture content at 280 to 350° C. is above 1,200 ppm, various problems described above will arise. Incidentally, the above-mentioned volatile moisture content, as in the case of the titanium dioxide powder, is the amount of water generated at a predetermined temperature under nitrogen atmosphere as measured by using a Karl Fischer moisture meter.

The masterbatch of the present invention is used preferably in particularly for melt extrusion laminate films which require high temperature processing as high as 280 to 350° C. The melt extrusion laminate films are subjected to high temperature processing as described above since they require strong adhesion to substrates (paper, metal, etc.).

Also, to the masterbatch of the present invention may be added any other known additives such as pigments and ultraviolet absorbents as desired so far as they do not inhibit the effects.

Specific examples of the masterbatch of the present invention are shown in Table 2.

TABLE 2

| | Titanium Dioxide | | |
|---|---|---|---|
| No. | Al in crystal | Surface Treatment (in terms of oxide) | Resin |
| 1 | 0.02 to 1.0 wt % | 0.01 to 0.5 wt % calcium salt treatment | thermoplastic resin |
| 2 | 0.02 to 1.0 wt % | 0.05 to 0.5 wt % calcium salt treatment, and then 0.05 to 3.0 wt % silane coupling agent treatment | thermoplastic resin |
| 3 | 0.02 to 1.0 wt % | 0.01 to 0.5 wt % calcium salt treatment, and then 0.01 to 0.5 wt % aluminate salt treatment | thermoplastic resin |

TABLE 2-continued

| | Titanium Dioxide | | |
|---|---|---|---|
| No. | Al in crystal | Surface Treatment (in terms of oxide) | Resin |
| 4 | 0.02 to 1.0 wt % | 0.01 to 0.5 wt % calcium salt treatment, 0.01 to 0.3 wt % aluminate salt treatment, and the 0.05 to 3.0 wt % silane coupling agent treatment | thermoplastic resin |
| 5 | 0.02 to 1.0 wt % | 0.01 to 0.5 wt % calcium salt treatment, and then 0.01 to 0.3 wt % silicate treatment | thermoplastic resin |
| 6 | 0.02 to 1.0 wt % | 0.01 to 0.5 wt % calcium salt treatment, 0.01 to 0.3 wt % silicate treatment, and then 0.05 to 3.0 wt % silane coupling treatment | thermoplastic resin |
| 7 | 0.02 to 1.0 wt % | 0.01 to 0.5 wt % magnesium salt treatment | themoplastic resin |
| 8 | 0.02 to 1.0 wt % | 0.05 to 0.5 wt % magnesium salt treatment, and th 0.05 to 3.0 wt % silane coupling agent treatment | thermoplastic resin |
| 9 | 0.02 to 1.0 wt % | 0.01 to 0.5 wt % magnesium salt treatment, and the 0.01 to 0.5 wt % aluminate salt treatment | thermoplastic resin |
| 10 | 0.02 to 1.0 wt % | 0.01 to 0.5 wt % magnesium salt treatment, 0.01 to 0.3 wt % aluminate salt treatment, and th 0.05 to 3.0 wt % silane coupling agent treatment | thermoplastic resin |
| 11 | 0.02 to 1.0 wt % | 0.01 to 0.5 wt % magnesium salt treatment, and th 0.01 to 0.3 wt % silicate treatment | thermoplastic resin |
| 12 | 0.02 to 1.0 wt % | 0.01 to 0.5 wt % magnesium salt treatment, 0.01 to 0.3 wt % silicate treatment, and then 0.05 to 3.0 wt % silane coupling treatment | thermoplastic resin |
| 13 | 0.02 to 1.0 wt % | 0.05 to 3.0 wt % silane coupling agent treatment | thermoplastic resin |
| 14 | 0.02 to 1.0 wt % | 0.01 to 0.3 wt % aluminate treatment, and then 0.05 to 3.0 silane coupling agent treatment | thermoplastic resin |
| 15 | 0.02 to 1.0 wt % | 0.01 to 0.3 wt % silicate treatment, and then 0.05 to 3.0 silane coupling agent treatment | thermoplastic resin |
| 16 | 0.02 to 1.0 wt % | 0.01 to 0.5 wt % calcium salt treatment, and then 0.05 to 3.0 wt % triethanolamine treatment | thermoplastic resin |
| 17 | 0.02 to 1.0 wt % | 0.01 to 0.5 wt % calcium salt treatment, 0.01 to 0.3 wt % aluminate treatment, and then 0.05 to 3.0 wt % triethanolamine treatment | thermoplastic resin |
| 18 | 0.02 to 1.0 wt % | 0.01 to 0.5 wt % calcium salt treatment, 0.01 to 0.3 wt % silicate treatment, and then 0.05 to 3.0 wt % triethanolamine treatment | thermoplastic resin |
| 19 | 0.02 to 1.0 wt % | 0.01 to 0.5 wt % magnesium salt treatment, and th 0.05 to 3.0 wt % triethanolamine treatment | thermoplastic resin |
| 20 | 0.02 to 1.0 wt % | 0.01 to 0.5 wt % magnesium salt treatment, 0.01 to 0.3 wt % aluminate treatment, and then 0.05 to 3.0 wt % triethanolamine treatment | thermoplastic resin |
| 21 | 0.02 to 1.0 wt % | 0.01 to 0.5 wt % magnesium salt treatment, 0.01 to 0.3 wt % silicate treatment, and then 0.05 to 3.0 wt % triethanolamine treatment | thermoplastic resin |
| 22 | 0.02 to 1.0 wt % | 0.05 to 3.0 wt % triethanolamine treatment | thermoplastic resin |
| 23 | 0.02 to 1.0 wt % | 0.01 to 0.5 wt % aluminate treatment, and then 0.05 to 3.0 wt % triethanolamine treatment | thermoplastic resin |
| 24 | 0.02 to 1.0 wt % | 0.01 to 0.5 wt % silicate treatment, and then 0.05 to 3.0 wt % triethanolamine treatment | thermoplastic resin |

(IV) Examples

Examples of the present invention will be shown below. In Examples 1 to 24, evaporated water was determined by heating the titanium dioxide powder at 200° C., for 1 hour to dehydrate it, heating at 350° C. to evaporate water, and measuring the amount of evaporated water. The heat dehydration was measured using a ring oven and the moisture content was measured using a Karl Fischer moisture meter (MKC-210 manufactured by KYOTO DENSHI KOGYO CO., LTD.).

EXAMPLE 1

To 2 liters of aqueous slurry (TiO$_2$ concentration: 500 g/l) containing anatase type titanium dioxide obtained by hydrolyzing titanium sulfate followed by calcination was added an aqueous sodium hydroxide solution to adjust the slurry to pH 8.5 and sodium hexametaphosphate was added to obtain dispersion slurry of titanium dioxide. After pulverizing the slurry on a sand mill, 0.1 wt % (2.63 g) as CaO of calcium chloride dihydrate was added thereto. Then after warming the slurry up to 60° C., 0.2 wt % as Al$_2$O$_3$ of sodium aluminate was added thereto with sufficient stirring. Subsequently, dilute sulfuric acid in a concentration of 10 wt % was dripped down over 30 minutes to adjust the slurry to pH 7.0 and the slurry in this state was stirred continuously for 60 minutes.

After filtering it in vacuum, the slurry was washed with water to wash out soluble salts. The washed filtration cake was taken out, to which was added water to make a slurry containing TiO$_2$ in a concentration of 400 g/l. The slurry was dried using a spray drier (Model R-2, manufactured by SAKAMOTO GIKEN) at an air inlet temperature of 250° C. and at an outlet temperature of 130° C. of hot air, and then pulverized in a hammer mill to obtain surface modified titanium dioxide powder of the present invention. The titanium dioxide powder had a volatile moisture content of 620 ppm.

EXAMPLE 2

The same procedures as in Example 1 were followed except that rutile type titanium dioxide was used as the raw material to obtain titanium dioxide powder of the present invention. The titanium dioxide powder had a volatile moisture content of 550 ppm.

EXAMPLE 3

In Example 1, the washed filtration cake was taken out and converted to a slurry of $TiO_2$ concentration of 400 g/l by adding water before drying, and γ-aminopropyltriethoxysilane as the silane coupling agent was added in an amount of 0.5 wt % based on $TiO_2$. With regard to other steps and conditions, the same procedures as in Example 1 were followed to obtain titanium dioxide powder by the method of the present invention. The titanium dioxide powder had a volatile moisture content of 480 ppm.

EXAMPLE 4

In Example 3, no sodium aluminate was added, methyltrimethoxysilane was used as the silane coupling agent, pulverized on a hammer mill and further pulverized on a steam micronizer with superheated steam at 270° C. With regard to other steps and conditions, the same procedures as in Example 3 were followed to obtain titanium dioxide powder by the method of the present invention. The titanium dioxide powder had a volatile moisture content of 430 ppm.

EXAMPLE 5

In Example 1, after the dried titanium dioxide powder was pulverized on a hammer mill, the powder was charged in a Henschel mixer, and vinyltriethoxysilane as the silane coupling agent was added in an amount of 0.5 wt % based on $TiO_2$. With regard to other steps and conditions, the same procedures as in Example 1 were followed to obtain titanium dioxide powder of the present invention. The titanium dioxide powder had a volatile moisture content of 480 ppm.

EXAMPLE 6

In Example 1, after the dry titanium dioxide powder was pulverized on a hammer mill and further pulverized on a steam micronizer with superheated steam at 270° C., the powder was charged in a Henschel mixer and dimethyldimethoxysilane as the silane coupling agent was added thereto in an amount of 0.5 wt % based on $TiO_2$. Otherwise, the same procedures as in Example 1 were followed to obtain titanium dioxide powder by the method of the present invention. The titanium dioxide powder had a volatile moisture content of 455 ppm.

EXAMPLE 7

The same procedures as in Example 6 were followed except that no calcium chloride was used to obtain titanium dioxide powder of the present invention was obtained. The titanium dioxide powder had a volatile moisture content of 480 ppm.

EXAMPLE 8

In Example 1, no sodium aluminate was added and pulverized on a steam micronizer with superheated steam at 270° C. To the steam micronizer was added triethanolamine as the organic dispersant in an amount of 0.5 wt % based on titanium dioxide. With regard to other steps and conditions, the same procedures as in Example 1 were followed to obtain titanium dioxide powder of the present invention. The titanium dioxide powder had a volatile moisture content of 405 ppm.

EXAMPLE 9

In Example 1, after the dry titanium dioxide powder was pulverized on a hammer mill and further pulverized on a steam micronizer with superheated steam at 270° C., triethanolamine as the organic dispersant was added to the steam micronizer in an amount of 0.5 wt % based on titanium dioxide. With regard to other steps and conditions, the same procedures as in Example 1 were followed to obtain titanium dioxide powder of the present invention. The titanium dioxide powder had a volatile moisture content of 465 ppm.

EXAMPLE 10

The same procedures as in Example 1 were followed except that sodium silicate (Water-glass No. 3) in place of sodium aluminate was added in an amount of 0.2 wt % in terms of $SiO_2$ to obtain titanium dioxide powder of the present invention. The titanium dioxide powder had a volatile moisture content of 640 ppm.

EXAMPLE 11

The same procedures as in Example 3 were followed except that no calcium chloride was added, sodium silicate (Water-glass No. 3) in place of sodium aluminate was added in an amount of 0.2 wt % in terms of $SiO_2$, and methyltrimethoxysilane in place of γ-amino-propyltriethoxysilane was added as the silane coupling agent in an amount of 0.5 wt % to obtain titanium dioxide powder of the present invention. The titanium dioxide powder had a volatile moisture content of 680 ppm.

EXAMPLE 12

The same procedures as in Example 3 were followed except that methyltrimethoxysilane in place of γ-aminopropyltriethoxysilane was added as the silane coupling agent in an amount of 0.5 wt % and sodium silicate (Water-glass No. 3) in place of sodium aluminate was added in an amount of 0.2 wt % in terms of $SiO_2$ to obtain titanium dioxide powder of the present invention. The titanium dioxide powder had a volatile moisture content of 670 ppm.

EXAMPLE 13

The same procedures as in Example 3 were followed except that triethanolamine in place of γ-aminopropyltriethoxysilane was added as the silane coupling agent in an amount of 0.5 wt % and sodium silicate (Water-glass No. 3) in place of sodium aluminate was added in an amount of 0.2 wt % in terms of $SiO_2$ to obtain titanium dioxide powder of the present invention. The titanium dioxide powder had a volatile moisture content of 655 ppm.

EXAMPLE 14

The same procedures as in Example 1 were followed except that the ratio of addition of calcium chloride was changed from 0.1 wt % to 0.5 wt % in terms of CaO and no sodium aluminate was added to obtain titanium dioxide powder of the present invention. The titanium dioxide powder had a volatile moisture content of 530 ppm.

EXAMPLE 15

The same procedures as in Example 3 were followed except that neither calcium chloride nor sodium aluminate was added and methyltrimethoxysilane in place of γ-aminopropyltriethoxysilane was added as the silane coupling agent in an amount of 0.5 wt % to obtain titanium dioxide powder by the present invention. The titanium dioxide powder had a volatile moisture content of 505 ppm.

EXAMPLE 16

The same procedures as in Example 3 were followed except that neither calcium chloride nor sodium aluminate was added and triethanolamine in place of γ-aminopropyltriethoxysilane was added in an amount of 0.5 wt % to obtain titanium dioxide powder of the present invention. The titanium dioxide powder had a volatile moisture content of 530 ppm.

EXAMPLE 17

The same procedures as in Example 1 were followed except that magnesium sulfate in place of calcium chloride was used in an amount of 0.5 wt % in terms of MgO and no sodium aluminate was added to obtain titanium dioxide powder of the present invention. The titanium dioxide powder had a volatile moisture content of 730 ppm.

EXAMPLE 18

The same procedures as in Example 1 were followed except that magnesium sulfate in place of calcium chloride was used in an amount of 0.15 wt % (4.48 g) in terms of MgO to obtain titanium dioxide powder of the present invention. The titanium dioxide powder had a volatile moisture content of 640 ppm.

EXAMPLE 19

The same procedures as in Example 4 were followed except that magnesium sulfate in place of calcium chloride was used in an amount of 0.5 wt % in terms of MgO to obtain titanium dioxide powder of the present invention. The titanium dioxide powder had a volatile moisture content of 580 ppm.

EXAMPLE 20

The same procedures as in Example 8 were followed except that magnesium sulfate in place of calcium chloride was used in an amount of 0.5 wt % in terms of MgO to obtain titanium dioxide powder of the present invention. The titanium dioxide powder had a volatile moisture content of 575 ppm.

EXAMPLE 21

The same procedures as in Example 6 were followed except that magnesium sulfate in place of calcium chloride was used in an amount of 0.5 wt % in terms of MgO to obtain titanium dioxide powder of the present invention. The titanium dioxide powder had a volatile moisture content of 680 ppm.

EXAMPLE 22

The same procedures as in Example 10 were followed except that magnesium sulfate in place of calcium chloride was used in an amount of 0.5 wt % in terms of MgO to obtain titanium dioxide powder of the present invention. The titanium dioxide powder had a volatile moisture content of 670 ppm.

EXAMPLE 23

The same procedures as in Example 21 were followed except that sodium silicate (Water-glass No. 3) in place of sodium aluminate was added in an amount of 0.2 wt % in terms of $SiO_2$ to obtain titanium dioxide powder of the present invention. The titanium dioxide powder had a volatile moisture content of 655 ppm.

The results of the Examples above are shown in Table 3. In addition, the volatile moisture content of non-treated titanium dioxide powder as a comparative sample was also shown. As shown in Table 3, the comparative sample which was not surface-treated had a volatile moisture content of 1,300 ppm whereas the surface-treated samples of the present invention all had a volatile moisture content of 640 ppm or less. The volatile moisture content will be more decreased when the treatment with a calcium salt and the treatment with a silane coupling agent are used in combination and will be most decreased when pulverization is conducted with superheated steam containing a silane coupling agent.

TABLE 3

| No. | Ca salt/Mg salt in terms of oxide | Addition amount of silane or amine (%) | Na aluminate or silicate (in terms of oxide %) | Drying - Pulveriation treatment, etc. | Volatile mositure content (ppm) |
| --- | --- | --- | --- | --- | --- |
| 1 | Ca chloride 0.1% | — | Na aluminate 0.2% | After drying, pulverization | 620 |
| 2 | Ca chloride 0.1% | — | Na aluminate 0.2% | (rutile type) | 550 |
| 3 | Ca chloride 0.1% | γ-aminopropyl-triethoxysilane 0.5% | Na aluminate 0.2% | After filtering, a silane coupling agent was added and dried | 480 |
| 4 | Ca chloride 0.1% | Methyltrimethoxy Silane 0.5% | — | After drying, pulverization by milling and with superheated steam | 430 |
| 5 | Ca chloride 0.1% | Vinyltriethocy-silane 0.5% | Na aluminate 0.2% | After drying and pulverization by milling, a silane coupling agent was added | 480 |
| 6 | Ca chloride 0.1% | Dimethyldimethoxy silane 0.5% | Na aluminate 0.2% | After drying, pulverization by milling and with a silane coupling agent was added | 455 |

TABLE 3-continued

| No. | Ca salt/Mg salt in terms of oxide | Addition amount of silane or amine (%) | Na aluminate or silicate (in terms of oxide %) | Drying - Pulveriation treatment, etc. | Volatile mositure content (ppm) |
|---|---|---|---|---|---|
| 7 | — | Dimethyldimethoxy silane 0.5% | Na aluminate 0.2% | After drying, pulverization by milling and with a silane coupling agent was added | 480 |
| 8 | Ca chloride 0.1% | Triethanolamine 0.5% 0.5% | — | After drying and pulverization by milling, triethanol-amine was added and pulverized with steam | 405 |
| 9 | Ca chloride 0.1% | Triethanolamine 0.5% | Na aluminate 0.2% | After drying and pulverization by milling, triethanolamine was added and pulverized with steam | 465 |
| 10 | Ca chloride 0.1% | — | Na silicate 0.2% | After drying, pulverization | 640 |
| 11 | — | Methyltrimethoxy silane 0.5% | Na silicate 0.2% | After drying, pulverization | 680 |
| 12 | Ca chloride 0.1% | Methyltrimethoxy silane 0.5% | Na silicate 0.2% | After drying, pulverization | 670 |
| 13 | Ca chloride 0.1% | Triethanolamine 0.5 % | Na silicate 0.2% | After drying, pulverization | 655 |
| 14 | Ca chloride 0.5% | — | — | After drying, pulverization | 530 |
| 15 | — | Methyltrimethoxy silane 0.5% | — | After drying, pulverization | 505 |
| 16 | — | Triethanolamine 0.5% | — | After drying, pulverization | 530 |
| 17 | Mg sulfate 0.5% | — | — | After drying, pulverization | 730 |
| 18 | Mg sulfate 0.15% | — | Na aluminate 0.2% | After drying, pulverization | 640 |
| 19 | Mg sulfate 0.5% | Methyltrimethoxy silane 0.5% | — | After drying, pulverization | 580 |
| 20 | Mg sulfate 0.5% | Triethanolamine 0.5% | — | After drying, pulverization | 575 |
| 21 | Mg sulfate 0.5% | Dimethyldimethoxy silane 0.5% | Na aluminate 0.2% | After drying, pulverization | 680 |
| 22 | Mg sulfate 0.5% | — | Na silicate 0.2% | After drying, pulverization | 670 |
| 23 | Mg sulfate 0.5% | Dimethyldimethoxy silane 0.5% | Na silicate 0.2% | After drying, pulverization | 655 |
| Comp Ex. | | No treatment | | Drying/pulverization | 1300 |

Note: Addition amount is a wt % value based on silica dioxide (solids content).

EXAMPLE 24

After filtering and washing hydrous titanium dioxide slurry obtained by hydrolyzing titanium sulfate, the slurry was converted to an aqueous suspension whose titanium dioxide concentration is 33%. To 1,000 g (330 g in terms of $TiO_2$) of the suspension were added 1.3 g of potassium carbonate, 0.7 g of diammonium phosphate and aluminum sulfate and zinc sulfate in introduction amounts in terms of aluminum (Al) and zinc (Zn) as shown in Table 4. After drying, the mixed slurry was left to stand in a heated oven at 800° C. for 1 hour. Thereafter, the slurry was calcined at 960° C. for 3 hours and pulverized to obtain titanium dioxide having an average particle size of 0.20 μm of primary particles. The powder was confirmed to be of anatase type titanium dioxide by X ray diffraction. The titanium dioxide powder samples were measured of light stability, whiteness and thermal stability as described below and the results obtained are shown in Table 4. Further, the titanium dioxide powder samples of this example were surface-treated in the same manner as in Example 8. The results obtained are shown in Table 4. As shown in Table 4, the titanium dioxide of this example were excellent in light stability and thermal stability, had high whiteness, and also had a considerably small volatile moisture content.

Method for evaluating light stability

After adding 2 g of the above-mentioned titanium dioxide powder to 1.6 ml of a water-soluble methylolmelamine resin paint and kneading, the mixture was coated on a glass plate with an applicator (4 mil) and dried. The plate was exposed with ultraviolet rays for 8 hours while rotating the plate on a plane. The color of the glass plate was measured before and after the exposure with ultraviolet rays and color difference was obtained. For the measurements, a color difference meter as prescribed by JIS-Z-8722 was used and the color difference was indicated according to Hunter color difference equation as prescribed by JIS-Z-8730.

Method for evaluating whiteness 5 g of the above-mentioned titanium dioxide powder was added to 45 g of polyethylene resin (MIRASON 402, manufactured by MITSUI PETROCHEMICAL INDUSTRY CO., LTD.) and after kneading at 150° C. using a two-roll mill, the mixture was molded into 1 mm thick sheet. The whiteness of the sheet was measured using the above-mentioned color difference meter.

Method for evaluating thermal stability

Polyethylene sheet containing the above-mentioned titanium dioxide was heated at 310° C. for 20 minutes in a small muffle furnace. The sheet was measured using the above-described color difference meter. The color difference between the sheets before and after heating was calculated along the Hunter color difference equation prescribed by JIS-Z-8370.

TABLE 4

| Sample No. | Al/Zn amounts in crystal (%) | Average particle size μm | Light stable color difference ΔE | White ness | Heat stable color difference ΔE | Ca salt/Mg salt addition amount % | Silane-amine addition amount % | Na aluminate addition amount % | Volatile moisture content ppm |
|---|---|---|---|---|---|---|---|---|---|
| 1 | Al:0.11 | 0.20 | 0.5 | 96.3 | 4.2 | Ca chloride 0.1 | Methyltri-methoxysilane 0.5 | — | 420 |
| 2 | Al:0.29 | 0.23 | 0.4 | 96.0 | 3.8 | | | | 435 |
| 3 | Zn:0.07 | 0.20 | 1.2 | 96.1 | 5.7 | | | | 455 |
| 4 | Zn:0.16 | 0.23 | 0.7 | 96.2 | 4.7 | | | | 460 |
| 5 | Al:0.02 Zn:0.12 | 0.21 | 1.1 | 96.3 | 5.3 | Ca chloride | Triethanol amine 0.5 | Na aluminate | 490 |
| 6 | Al:0.19 Zn:0.09 | 0.21 | 0.6 | 96.1 | 4.4 | 0.1 | | 0.2 | 485 |
| Comparative | — | 0.20 | 2.2 | 95.9 | 9.1 | | No treatment | | 1300 |

Notes: Ca salt/Mg salt addition amount and Na aluminate addition amount are amounts in terms of oxides based on titanium dioxide (solids content).

EXAMPLES 25–46 AND COMPARATIVE EXAMPLES 1–2

Low density polyethylene (specific gravity 0.917, MFR 7.0 g/10 min) and surface-treated titanium dioxide shown in Table 5 were mixed in predetermined blend ratios, mixed with heating in a kneader and then cooled and pulverized, extrusion molded through an extruder to obtain a masterbatch in the form of pellets. The masterbatch was subjected to various evaluation tests. The evaluation tests were carried out by the following methods. The results obtained are summarized in Table 5.

The blend ratios of the low density polyethylene and the surface treated titanium dioxide were 30 wt % of polyethylene and 70 wt % of titanium dioxide in Example 31, 50 wt % of polyethylene and 50 wt % of titanium dioxide in Example 32, and 40 wt % of polyethylene and 60 wt % of titanium dioxide in others.

Method for measuring moisture

The masterbatch obtained (1 g) was used to measure the amount of water generated (unit: ppm) at each temperature using a Karl Fischer moisture meter (manufactured by HIRANUMA SANGYO CO., LTD.).

Method for evaluating dispersibility

At an outlet of a Labo Plastomill single screw extruder (manufactured by TOYO SEIKI CO., LTD., axial length 20 mm) were fitted screens having increasing meshes of 40/80/120/500 is stated order and pellets of a 1:1 blend of low density polyethylene (specific gravity 0.916, MFR 9.0 g/10 min) and masterbatch were passed therethrough by 50 rpm and at an extrusion temperature of 300° C. and there were obtained an initial pressure (P1) when the passing was started and then a final pressure (P2) when a predetermined amount (containing 360 g of titanium oxide in the pellets) of the above-mentioned 1:1 blend pellets was passed. The smaller the difference in pressure ΔP=P2−P1 is, the better the dispersibility of titanium oxide is.

T-Die film formability 67 wt % of the above-mentioned masterbatch and 33 wt % of low density polyethylene (specific gravity 0.918, MFR 4.0 g/10 min) were blended and T-die films of 30μm thick, respectively, were prepared at molding temperatures of 280° C., 300° C., and 350° C., respectively, using a T-die film molding machine (manufactured by TOYO SEIKI CO., LTD.), and film formability (appearance) thereof was evaluated. It should be noted that 57 wt % of the masterbatch and 43 wt % of the low density polyethylene were used in Example 37 and 80 wt % of the masterbatch and 20 wt % of the low density polyethylene were used in Example 38.

Evaluation of film formability was performed by visual observation of the occurrence of lacing, etc. In table 5, symbols ⊙, ○, and Δ, and X indicate the following ratings.

⊙: No lacing nor foaming at all, ○ some lacing and foaming occurred, Δ: lacing and foaming occurred, X: considerable lacing and foaming and impossible to form films

TABLE 5

| No. | Treating amount of silane coupling agent or triethanolamine | Treating Amounts of Ca or Mg salt | Treating amounts of alumina silica | Dispersability Δp kg/cm² | Moisture content in masterbatch (ppm) | | | T-die film formability | | |
|---|---|---|---|---|---|---|---|---|---|---|
| | | | | | 280° C. | 300° C. | 350° C. | 280° C. | 300° C. | 350° C. |
| 25 | Methyltrimethoxy-silane 0.5% | Ca chloride 0.3% | — | 9 | 470 | 505 | 545 | ⊙ | ⊙ | ⊙ |
| 26 | γ-aminopropyl triethoxysilane 0.5% | Ca chloride 0.3% | — | 9 | 310 | 358 | 403 | ⊙ | ⊙ | ⊙ |
| 27 | Methacrylsilane* 0.5% | Ca chloride 0.3% | — | 29 | 345 | 377 | 400 | ⊙ | ⊙ | ⊙ |
| 28 | Ethoxysilane** 0.5% | Ca chloride 0.3% | — | 5 | 350 | 414 | 455 | ⊙ | ⊙ | ⊙ |

TABLE 5-continued

| No. | Treating amount of silane coupling agent or tri-ethanolamine | Treating Amounts of Ca or Mg salt | Treating amounts of alumina silica | Dispersability Δp kg/cm² | Moisture content in masterbatch (ppm) 280° C. | 300° C. | 350° C. | T-die film formability 280° C. | 300° C. | 350° C. |
|---|---|---|---|---|---|---|---|---|---|---|
| 29 | Methyltrimethoxy-silane 0.5% | Ca chloride 0.24% | alumina 0.2% | 34 | 591 | 653 | 682 | ⊚ | ⊚ | ○ |
| 30 | γ-aminopropyl-triethoxysilane 0.5% | Ca chloride 0.24% | alumina 0.2% | 13 | 621 | 771 | 810 | ⊚ | ⊚ | Δ |
| 31 | γ-aminopropyl-triethoxysilane 0.5% | Ca chloride 0.24% | Alumina 0.2% | 11 | 720 | 850 | 1000 | ⊚ | ⊚ | Δ |
| 32 | γ-aminopropyl-triethoxysilane 0.5% | Ca chloride 0.24% | Alumina 0.2% | 12 | 510 | 630 | 740 | ⊚ | ⊚ | Δ |
| 33 | — | Ca chloride 0.3% | Alumina 0.2% | 20 | 470 | 601 | 730 | ⊚ | ⊚ | Δ |
| 34 | Siloxane 0.2% | Ca chloride 0.3% | — | 5 | 451 | 496 | 635 | ⊚ | ⊚ | Δ |
| 35 | siloxane 0.3% | Ca chloride 0.24% | alumina 0.2% | 14 | 456 | 502 | 698 | ⊚ | ⊚ | Δ |
| 36 | triethanolamine 0.3% | Ca chloride 0.3% | — | 7 | 380 | 425 | 515 | ⊚ | ⊚ | ⊚ |
| 37 | Dimethyldimethoxy silane 0.5% | Ca chloride 0.3% | — | 9 | 330 | 380 | 413 | ⊚ | ⊚ | ⊚ |
| 38 | Dimethyldimethoxy silane 0.5% | Ca chloride 0.24% | alumina 0.2% | 8 | 490 | 588 | 635 | ⊚ | ⊚ | ○ |
| 39 | Dimethyldimethoxy silane 0.5% | — | alumina 0.2% | 10 | 520 | 610 | 650 | ⊚ | ⊚ | ○ |
| 40 | — | Ca chloride 0.1% | silica 0.2% | 30 | 530 | 680 | 781 | ⊚ | ⊚ | Δ |
| 41 | Methyltrimethoxysilane 0.5% | — | silica 0.2% | 25 | 630 | 720 | 830 | ⊚ | ⊚ | Δ |
| 42 | — | Ca chloride 0.5% | — | 48 | 440 | 570 | 710 | ⊚ | ⊚ | Δ |
| 43 | Methyltrimethoxysilane 0.5% | — | — | 15 | 510 | 540 | 585 | ⊚ | ⊚ | ○ |
| 44 | — | Mg sulfate 0.5% | — | 55 | 460 | 590 | 730 | ⊚ | ⊚ | Δ |
| 45 | Vinyltriethoxysilane 0.5% | Ca chloride 0.1% | alumina 0.2% | 14 | 562 | 631 | 724 | ⊚ | ⊚ | Δ |
| 46 | — | Mg sulfate 0.15% | alumina 0.2% | 38 | 530 | 625 | 740 | ⊚ | ⊚ | Δ |
| Comp. Ex. 1 | — | — | alumina 0.6% | 23 | 1100 | 1484 | 2200 | Δ | Δ | X |
| Comp. Ex. 2 | Trimethylolethane 0.3% | — | alumina 0.3% | 214 | 1250 | 1452 | 2100 | Δ | Δ | X |

Methacrylsilane*: γ-methacryloxypropyltrimethoxysilane
Ethoxysilane**: γ-glycidoxypropyltrimethoxysilane As shown in Table 5, the masterbatch of this example had a volatile moisture content of 1,000 ppm or less and mostly on the order of 300 to 500 ppm, at heat processing temperatures of 280 to 350° C. On the other hand, the volatile moisture content of comparative examples were 1,100 to 2,200 ppm. Therefore, the masterbatches of the present invention had considerably low volatile moisture content.

As for the film formability, most of the examples of the present invention showed no lacing nor foaming at all though at 350° C. such undesirable phenomena occurred in a portion thereof. However, none was impossible to form films. On the other hand, the comparative examples were poor in film formability and were impossible to form films at 350° C.

The T-die films (thickness 30 μ) prepared by extrusion at 300° C. in Examples 34 and 35 were measured for transmittance at each wavelength using a calorimeter (manufactured by Kurabo Co., Ltd.) to obtain the results shown in Table 6. As shown in Table 6, higher transmittance resulted in poorer opacifying properties. The examples of the present invention each showed a transmittance as low as 2.01 to 2.53, which confirmed that they had good opacifying properties.

TABLE 6

| Wavelength | 440 nm | 540 nm | 560 nm | 580 nm | 600 nm |
|---|---|---|---|---|---|
| Example 34 | 2.20 | 2.44 | 2.41 | 2.48 | 2.53 |
| Example 35 | 2.01 | 2.20 | 2.26 | 2.34 | 2.38 |

INDUSTRIAL APPLICABILITY

According to the present invention, there is provided titanium dioxide powder having volatile moisture content of 800 ppm or less at heat processing temperatures of 200 to 350° C. The titanium dioxide powder evaporates extremely small amounts of water when added and kneaded into plastics at the above-described temperatures and hence there is no fear that a decrease in quality due to foams will occur. Therefore, there can be obtained therefrom high quality molded articles which are excellent in weatherability and resistance to light and which show high precision in dimension. The titanium dioxide powder can be manufactured without difficulty by the manufacturing method of the present invention.

Further, according to the present invention, there can be obtained high quality masterbatches which are excellent in hydrophobicity, dispersibility, and high temperature processability, and which have volatile moisture content of 1,200 ppm or less, preferably 800 ppm or less, at the above-mentioned heat processing temperatures.

What is claimed is:

1. Titanium dioxide containing volatile moisture in an amount of 800 ppm or less wherein said volatile moisture evaporates under heat processing at temperatures of 200 to 350° C.

2. The titanium dioxide as claimed in claim 1, wherein the amount of volatile moisture before evaporation is 650 ppm or less.

3. Anatase type titanium dioxide containing in its crystal divalent or trivalent non-colored cations having a hexacoordination ionic radius of 0.6 or more and 0.9 or less and further containing volatile moisture in an amount of 800 ppm or less, wherein said volatile moisture evaporates under heat processing at temperatures of 200 to 350° C.

4. The titanium dioxide as claimed in claim 3, wherein said titanium dioxide contains 0.02 to 0.4 wt % of aluminum or 0.05 to 1.0 wt % of zinc in its crystal.

5. The titanium dioxide as claimed in claim 3, wherein said titanium dioxide contains aluminum and zinc in its crystal, and wherein the total content of the both is 0.02 to 1.0 wt % and the content of aluminum is 0.4 wt % or less.

6. The titanium dioxide as claimed in claim 3, wherein said titanium dioxide has an average particle size of primary particles of 0.01 to 1.0 μm.

7. A method for manufacturing titanium dioxide, which comprises:

adding to titanium dioxide powder 0.01 to 0.5 wt % in terms of calcium oxide of a calcium salt and/or 0.05 to 3.0 wt % of a silane coupling agent; and treating the titanium dioxide powder therewith so that said titanium dioxide contains volatile moisture in an amount of 800 ppm or less, wherein said volatile moisture evaporates under heat processing at temperatures of 200 to 350° C.

8. The manufacturing method as claimed in claim 7, wherein together with said treatment with the calcium salt and/or silane coupling agent, a treatment with 0.3 wt % in terms of alumina of an aluminate is performed.

9. The manufacturing method as claimed in claim 7, wherein as said silane coupling agent is used methyltrimethoxysilane, γ-glycidoxypropyltrimethoxysilane, γ-aminopropyltriethoxysilane, vinyltriethoxysilane, phenyltrialkoxysilane, or dialkyldialkoxysilane.

10. The manufacturing method as claimed in claim 7, wherein 0.05 to 3.0 wt % of triethanolamine is used in place of said silane coupling agent.

11. The manufacturing method as claimed in claim 8, wherein 0.3 wt % or less in terms of silica of a silicate in place of said aluminate.

12. The manufacturing method as claimed in claim 7, wherein after said treatment, said powder is dried or pulverized at temperatures of 200° C. or higher.

13. The manufacturing method as claimed in claim wherein after said drying, said powder is pulverized in the presence of an organic dispersant.

14. The manufacturing method as claimed in claim 13, wherein said organic dispersant is at least one of silane coupling agents, titanium coupling agents, silicone oil, polyhydric alcohols, alkyldisilazanes, and alkanolamines.

15. A masterbatch comprising a thermoplastic resin containing therein titanium dioxide containing volatile moisture in an amount of 800 ppm or less, wherein said volatile moisture evaporates under heat processing at temperatures of 200 to 350° C.

16. A masterbatch comprising a thermoplastic resin containing therein anatase type titanium dioxide, wherein said titanium dioxide contains in its crystal divalent or trivalent non-colored cations whose hexacoordination ionic radius of 0.6 or more and 0.9 or less and said titanium dioxide further contains volatile moisture in an amount of 800 ppm or less, wherein said volatile moisture evaporates under heat processing at temperatures of 200 to 350° C.

17. The masterbatch as claimed in claim 16, comprising titanium dioxide containing 0.02 to 0.4 wt % of aluminum or 0.05 to 1.0 wt % of zinc in its crystal.

18. The masterbatch as claimed in claim 16, comprising titanium dioxide containing aluminum and zinc in its crystal, the total content of the both being 0.02 to 1.0 wt % and the content of aluminum being 0.4 wt % or less.

19. The masterbatch as claimed in claim 16, comprising titanium dioxide having an average particle size of primary particles of 0.01 to 1.0 μm.

20. A masterbatch comprising a thermoplastic resin containing therein anatase type titanium dioxide, wherein said titanium dioxide contains volatile moisture in an amount of 800 ppm or less, wherein said volatile moisture evaporates under heat processing at temperatures of 200 to 350° C.; and adding to said titanium dioxide 0.01 to 0.5 wt % in terms of calcium oxide of a calcium salt and/ or 0.05 to 3.0 wt % of a silane coupling agent.

21. The masterbatch as claimed in claim 20, comprising titanium dioxide, said titanium dioxide being treated, together with the calcium salt and/or silane coupling agent, with 0.3 wt % or less in terms of alumina of an aluminate.

22. The masterbatch as claimed in claim 20, comprising titanium dioxide, said titanium dioxide being treated using, as said silane coupling agent, methyltrimethoxysilane, γ-glycidoxypropyltrimethoxysilane, γ-aminopropyltriethoxysilane, vinyltriethoxysilane, phenyltrialkoxysilane, or dialkyldialkoxysilane.

23. The masterbatch as claimed in claim 20, comprising titanium dioxide, said titanium dioxide being treated using 0.05 to 3.0 wt % of triethanolamine in place of said silane coupling agent.

24. The masterbatch as claimed in claim 21, comprising titanium dioxide, said titanium dioxide being treated using 0.3 wt % or less in terms of silica of a silicate in place of said aluminate.

25. The masterbatch as claimed in claim 20, comprising titanium dioxide, said titanium dioxide being, after said surface treatment, dried or pulverized at temperatures of 200° C. or higher.

26. The masterbatch as claimed in claim 25, comprising titanium dioxide, said titanium dioxide being, after said drying, pulverized in the presence of an organic dispersant.

27. The masterbatch as claimed in claim 26, wherein said organic dispersant is at least one of silane coupling agents, titanium coupling agents, silicone oil, polyhydric alcohols, alkyldisilazanes, and alkanolamines.

28. A masterbatch as claimed in claim 15, the amount of volatile moisture before evaporation is 1,200 ppm or less at temperature of 280 to 350° C.

29. The masterbatch as claimed in claim 23, characterized in that said masterbatch is one for use in a melt extrusion laminate film.

* * * * *